Figure 1:
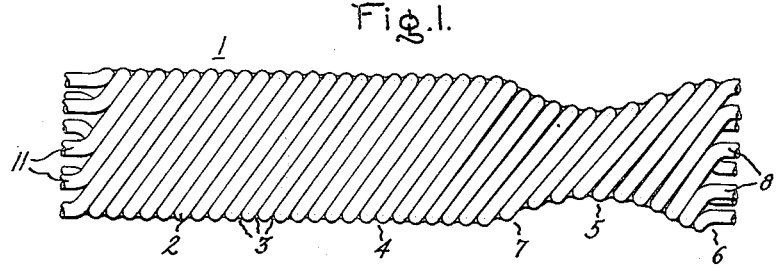

July 11, 1961

A. J. NERAD ET AL 2,991,617

JET MOTOR COMBUSTION CHAMBER

Filed Dec. 1, 1950

Inventors:
Anthony J. Nerad,
George L. MacPherson,
by Paul A. Frank
Their Attorney.

United States Patent Office 2,991,617
Patented July 11, 1961

2,991,617
JET MOTOR COMBUSTION CHAMBER
Anthony J. Nerad, Alplaus, and George L. Macpherson, Scotia, N.Y., assignors to General Electric Company, a corporation of New York
Filed Dec. 1, 1950, Ser. No. 198,608
1 Claim. (Cl. 60—35.6)

This invention relates to jet propulsion motors. More particularly, it relates to an improved motor wall construction for jet propulsion devices.

The term "jet propulsion motor" as used herein refers to all so-called reaction type motors or devices wherein the mechanical driving thrust is derived from the reaction of equal and opposite forces arising between the motor body and the body of the reactants by virtue of the change in momentum of the reactants or propellants obtained during conversion of the reactants into products of greater gaseous volume than that previously occupied by the reactants, as distinguished from internal combustion engines. Examples of devices falling within the scope of this invention are rocket motors, ram jets, turbo-jets, pulse jets, and turbo-prop-jets. While the present invention is hereinafter described with particularity in relation to a rocket motor, it will be understood that it is applicable to jet propulsion devices in general.

One of the major problems in the design of rocket motors is that of cooling the walls which are exposed to the hot combustion gases. As presently constructed, rocket motors are normally of sheet metal fabricated into a suitable shape. The metal motor wall is usually surrounded by a cooling jacket through which one of the propellants or reactants is circulated before being introduced into the combustion chamber. Thus, in an alcohol-oxygen propelled rocket, the alcohol is often used as a cooling means in the cooling jacket, though the oxygen may also be so used. Alternatively, water or some other non-propellant fluid may be used.

With the use of higher chamber pressures and thrust in rocket motors, there is an increasing need for rocket motor wall structures which afford better heat transfer and fewer failures due to burn-outs or hot spots. Thus, as the rocket motor walls are increased in thickness to withstand greater stresses, the temperature of the walls increases and further complicates the cooling problem. There is, therefore, a need for light rocket motor walls having high strength at high temperatures combined with a high rate of heat transfer.

It is an object of this invention to provide a rocket motor having a wall of superior strength under high stress and temperature.

It is a further object of the present invention to provide a rocket motor wall of superior strength which embodies therein an integral cooling means.

Another object of the invention is to provide a rocket motor wall of high strength and low weight.

A still further object of the invention is to provide a rocket motor wall which is characterized by a high heat transfer rate.

Figure 2:
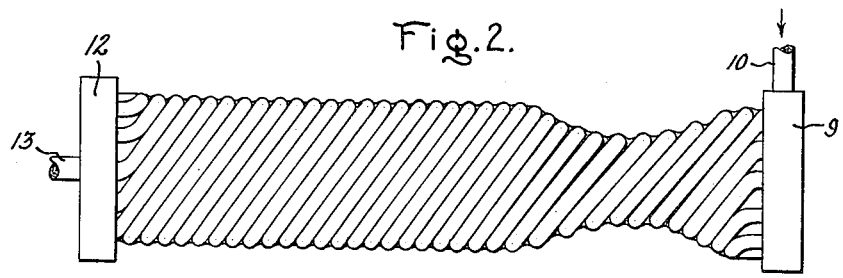

Our invention and further objects and advantages thereof may best be understood by reference to the following description and the drawing in which FIGURE 1 is a side elevation view showing the motor wall of our invention, and FIGURE 2 shows a similar view of a rocket incorporating our improved motor wall.

It has been found that a rocket motor wall having the above advantages may be provided by helically wind the above advantages may be provided by helically winding metal tubing in the desired form of the rocket motor.

More particularly, it has been found that such an improved rocket motor wall may be provided by winding or arranging metal tubing in helical fashion about the axis of the motor, increasing the pitch of slope of the helices to provide converging sections and decreasing the pitch to provide diverging portions, with straight sections formed by maintaining the pitch constant. Preferably, a plurality of tubes are wound in parallel for reasons which will be discussed more fully hereinafter. The adjoining portions of the tubing are preferably joined together by welding or brazing. The tubing itself may be of copper, aluminum, nickel, stainless steel, or other metal which may be made into tubing and shaped.

Reference is made to the drawing for a more complete understanding of the structure of the present rocket motor wall. In the particular embodiment shown in FIGURE 1, the motor or combustor wall 1 comprises a plurality of juxtaposed pieces of copper tubing 2 wound as shown in helix fashion and welded or brazed together as at 3 to form a unitary structure with the ends of the tubes free for connection to a cooling fluid manifold and injection head. Normally the throat section at 5 is formed first. Starting with a bundle of tubes 2 at this point the tubes are twisted into helices of decreasing pitch to form the flaring nozzle portion 6 as well as that part 7 of the venturi which lies upstream of the throat 6. The cylindrical body portion 4 is formed by twisting, winding, or arranging the tubes into helices of constant pitch after the desired diameter has been attained. The nozzle ends 8 of the tubes 2 are connected to a manifold or collector 9 shown in FIGURE 2 which has an inlet tube 10 which serves to feed coolant to the manifold and thence through tubes 2 for cooling purposes. The upstream ends 11 of tubes 2 are connected to an injection head which injects the coolant-propellant into the motor, the other propellant being introduced through conduit 13. If desired, of course, the coolant used need not be one of the propellants or reactants, but a separate fluid such as water or other well known cooling media which may be recirculated.

The rocket motor wall of our invention may be constructed of any metal tubing which is capable of being shaped and bent as described. Copper, stainless steel, carbon steel, and aluminum are preferred. The size or diameter of the motor will determine the size of tubing to be used. For example, for a motor eight inches in diameter, tubing having a five-sixteenths inch outer diameter and a .020 inch wall is preferred.

The structure described may be fabricated by placing a minimum of stress and strain on the tubular components. Whereas, when the tubes are arranged in an axially extending manner and bent inwardly to form the throat and outwardly to form the nozzle they become distorted, flattened, and stressed, by the present method the tubes retain their circular cross-section throughout and afford a strong, relatively unstressed structure. Tubes of cross-section other than circular also operate at higher stress when internal pressure is applied than do tubes of circular cross-section.

According to the present invention the spacing between adjacent turns of the tubes is held to a minimum so that a maximum of the cooling tube surface is presented to the hot combustion products in an actual installation. Besides affording an unstressed motor wall, the inherent strength of the tubes is superior to that of the usual metal cylinder used as the motor wall. Additionally, no separate provision or structure is needed for cooling purposes. In the illustrated construction the thickness of the motor wall is relatively independent of chamber pressures as contrasted to conventional motors in which the wall thickness and weight must be increased greatly as internal pressures become greater. The relatively thin walls of the tubing insure efficient cooling, a quick exchange of heat from the motor chamber to the coolant, and level out inequalities in heat transfer and hot spots which occur in motors of conventional design.

The light weight of this motor structure, attributable to the use of motor walls of relatively thin tubing, is an important factor in improving the thrust-weight factor of the rocket power plant. For example, the thrust-weight ratio of a motor of our invention having a chamber pressure of 300 pounds per square inch and a thrust of 28,000 pounds is about 150. For a motor of conventional design with comparable thrust, the thrust-weight ratio is only about one half this value.

By choosing tubing having a suitable inside diameter the flow of coolant-reactant fluid through the tubes and the pressure drop may be closely controlled to obviate any tendency toward pulsation.

If desired, the motor wall may be constructed of a single length of tubing formed as described. However, it is preferred to use a plurality of tubes to shorten the flow path of the coolant and provide better control over its pressure drop. In certain installations it may be desirable to use both reactants as coolants. In this case each of the reactants may be fed through a separate series of tubes.

By the present invention, there is provided a rocket motor having a wall of helically arranged tubes or tubing which, as compared to walls of conventional design, is light in weight, has high strength, a high rate of heat transfer, and provides integral means for circulating coolant.

What we claim as new and desire to secure by Letters Patent of the United States is:

In a jet propulsion device, an elongated combustion chamber composed solely of a plurality of metal tubes formed as a single layer multi-pass helix having a wide-pitch and bonded together to form a rigid elongated cylindrical portion, a throat portion of greater pitch than the cylindrical portion, and a nozzle portion of lesser pitch than the throat portion.

References Cited in the file of this patent

UNITED STATES PATENTS

| | | |
|---|---|---|
| 644,039 | Benton | Feb. 20, 1900 |
| 1,828,784 | Perrin | Oct. 27, 1931 |
| 1,915,352 | Bottoms | June 27, 1933 |
| 2,569,446 | Bonvillian et al. | Oct. 2, 1951 |

FOREIGN PATENTS

| | | |
|---|---|---|
| 459,924 | Great Britain | Jan. 18, 1937 |

OTHER REFERENCES

Astronautics Magazine, October 1936, (No. 35), pages 7 and 8 (article by Dr. Sanger).